United States Patent
Ozaki

(10) Patent No.: US 10,634,517 B2
(45) Date of Patent: Apr. 28, 2020

(54) RESOLVER STATOR

(71) Applicant: Japan Aviation Electronics Industry, Ltd., Tokyo (JP)

(72) Inventor: Yoshiaki Ozaki, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 498 days.

(21) Appl. No.: 15/505,274

(22) PCT Filed: Sep. 10, 2015

(86) PCT No.: PCT/JP2015/004618
§ 371 (c)(1),
(2) Date: Feb. 21, 2017

(87) PCT Pub. No.: WO2016/042745
PCT Pub. Date: Mar. 24, 2016

(65) Prior Publication Data
US 2017/0268904 A1    Sep. 21, 2017

(30) Foreign Application Priority Data
Sep. 19, 2014   (JP) ................................. 2014-191024

(51) Int. Cl.
*H02K 3/50* (2006.01)
*G01D 5/20* (2006.01)
(Continued)

(52) U.S. Cl.
CPC ............. *G01D 5/20* (2013.01); *G01D 5/2046* (2013.01); *H02K 3/345* (2013.01); *H02K 3/522* (2013.01); *H02K 24/00* (2013.01); *H02K 2203/06* (2013.01)

(58) Field of Classification Search
CPC .. H02K 3/00; H02K 3/18; H02K 3/28; H02K 3/32; H02K 3/325; H02K 3/34;
(Continued)

(56) References Cited

U.S. PATENT DOCUMENTS

| | | | |
|---|---|---|---|
| 2004/0183388 A1* | 9/2004 | Rittmeyer | H02K 3/28 310/179 |
| 2006/0033395 A1* | 2/2006 | Izumi | H02K 3/18 310/208 |
| 2008/0169714 A1* | 7/2008 | Kataoka | G01D 5/20 310/71 |

FOREIGN PATENT DOCUMENTS

| | | |
|---|---|---|
| JP | 61-32778 | 2/1986 |
| JP | H09-121520 A | 5/1997 |

(Continued)

OTHER PUBLICATIONS

International Search Report dated Dec. 22, 2015 in corresponding PCT/JP2015/004618; 4pgs.
(Continued)

*Primary Examiner* — Tran N Nguyen
(74) *Attorney, Agent, or Firm* — Maier & Maier, PLLC

(57) ABSTRACT

A resolver stator includes a stator core including a ring-shaped stator core main body, and a number of tooth parts protruding radially inward from the stator core main body, an insulator disposed radially inward with respect to the stator core main body, a number of coils wound around the plurality of tooth parts respectively, and a connecting wire configured to electrically connect the coils to one another. The insulator includes an insulator main body having an insulator main body inner surface facing radially inward, and a protruding part protruding radially inward beyond the insulator main body inner surface. The connecting wire is
(Continued)

opposed to the protruding part in an axial direction and also opposed to the insulator main body inner surface in a radial direction.

13 Claims, 12 Drawing Sheets

(51) Int. Cl.
*H02K 24/00* (2006.01)
*H02K 3/52* (2006.01)
*H02K 3/34* (2006.01)

(58) Field of Classification Search
CPC    H02K 3/345; H02K 3/46; H02K 3/50; H02K 3/52; H02K 3/522; H02K 24/00; G01D 5/00; G01D 5/20; G01D 5/204; G01D 5/2046
See application file for complete search history.

(56) References Cited

FOREIGN PATENT DOCUMENTS

| JP | 2003207370 A | 7/2003 |
| JP | 2003-333781 A | 11/2003 |
| JP | 2009131033 A | 6/2009 |
| JP | 2009-264892 A | 11/2009 |
| JP | 2009264892 A | 11/2009 |
| JP | 2013198268 A | 9/2013 |
| JP | 5414918 B1 | 2/2014 |

OTHER PUBLICATIONS

Extended European Search Report dated Aug. 7, 2017, including a Supplementary European Search Report and the European Search Opinion, in connection with corresponding EP Application No. 15842679.3 (10 pgs.).

* cited by examiner

RESOLVER STATOR

TECHNICAL FIELD

The present invention relates to a resolver stator.

BACKGROUND ART

As one of this kind of technique, Patent Literature 1 discloses a stator 100 for a rotor inside-rotatable magnetic generator in which a magnetic rotor is disposed so as to rotate inside the stator 100 as shown in FIG. 12 of the present application. In this stator 100, a connecting wire 102 for connecting adjacent power-generating coils 101 to each other is disposed along an inner-peripheral surface 104 of a ring-shaped yoke part 103. Further, in order to prevent the connecting wire 102 from being broken due to vibrations, the connecting wire 102 is bonded and fixed to the inner-peripheral surface 104 of the yoke part 103 by an adhesive 105 that is applied so as to cover the connecting wire 102.

CITATION LIST

Patent Literature

Patent Literature 1: Japanese Unexamined Patent Application Publication No. H09-121520

SUMMARY OF INVENTION

Technical Problem

It is conceivable that even when the connecting wire 102 is disposed along the inner-peripheral surface 104 of the yoke part 103 as shown in the aforementioned Patent Literature 1 as well as when the connecting wire 102 is disposed on an end face of the yoke part 103 in the axial direction thereof unlike in the aforementioned Patent Literature 1, a wire that has already been wound could be accidentally cut off by the tip of a winding machine during a winding process, and the connecting wire 102 could be touched by the hand when an operator holds the stator 100, resulting in damage of the connecting wire 102.

To cope with this, in the aforementioned Patent Literature 1, the adhesive 105 is applied to the connecting wire 102 so as to cover the connecting wire 102, so that when the operator holds the stator 100, the operator cannot directly touch the connecting wire 102 by the hand. However, since this structure requires the process for applying the adhesive 105, the manufacturing cost is high.

An object of the present invention is to provide a technique for preventing an operator from touching a connecting wire directly by the hand when the operator holds a resolver stator.

Solution to Problem

According to an aspect, the present invention provides a resolver stator including: a stator core comprising a ring-shaped stator core main body, and a plurality of tooth parts protruding radially inward from the stator core main body; an insulator disposed radially inward with respect to the stator core main body; a plurality of coils wound around the plurality of tooth parts respectively; and at least one connecting wire configured to electrically connect the plurality of coils to one another, wherein the insulator comprises an insulator main body having an insulator main body inner surface facing radially inward, and a protruding part protruding radially inward beyond the insulator main body inner surface, and the at least one connecting wire is disposed so as to be opposed to the protruding part in a direction parallel to a rotation axis of the resolver stator and also opposed to the insulator main body inner surface in a direction perpendicular to the rotation axis.

The at least one connecting wire touches the protruding part in the direction parallel to the rotation axis.

The insulator main body inner surface is formed as a plane surface.

The insulator further comprises a holding protrusion protruding from the protruding part in the direction parallel to the rotation axis, and the at least one connecting wire is disposed between the insulator main body inner surface and the holding protrusion.

The insulator further comprises at least one access passage for allowing the at least one connecting wire to be wired to an opposite side of the protruding part without getting over the protruding part.

The at least one access passage comprises two access passages, and both ends of the at least one connecting wire are wired to the opposite side of the protruding part through the two access passages respectively.

The insulator main body inner surface has a first insulator main body inner surface and a second insulator main body inner surface adjacent to each other in a circumferential direction, each of the first and second insulator main body inner surfaces is formed as a plane surface, and an angle between the first and second insulator main body inner surfaces is smaller than 180 degrees.

The insulator further comprises a holding protrusion protruding from the protruding part in the direction parallel to the rotation axis, and the at least one connecting wire is disposed between the insulator main body inner surface and the holding protrusion.

The holding protrusion is disposed near an intersection or an imaginary intersection of the first and second insulator main body inner surfaces.

The at least one connecting wire comprises a plurality of connecting wires, and between two of the coils that are adjacent to each other in a circumferential direction, the plurality of connecting wires are disposed so as to be opposed to the protruding part in the direction parallel to the rotation axis and also opposed to the insulator main body inner surface in the direction perpendicular to the rotation axis, while being piled up on each other in a bundle-like manner.

The at least one connecting wire comprises a plurality of connecting wires, the insulator further includes an additional protruding part protruding radially inward beyond the protruding part, and between two of the coils that are adjacent to each other in a circumferential direction, one of the connecting wires is disposed so as to be opposed to the protruding part in the direction parallel to the rotation axis and also opposed to the insulator main body inner surface in the direction perpendicular to the rotation axis, and another of the connecting wires is disposed so as to be opposed to the additional protruding part in the direction parallel to the rotation axis and also opposed to the protruding part in the direction perpendicular to the rotation axis.

Advantageous Effects of Invention

According to the present invention, it is possible to prevent an operator from touching a connecting wire directly by the hand when the operator holds a resolver stator.

DESCRIPTION OF EMBODIMENTS

First Exemplary Embodiment

A first exemplary embodiment is explained hereinafter with reference to FIGS. 1 to 10.

Figure 1:
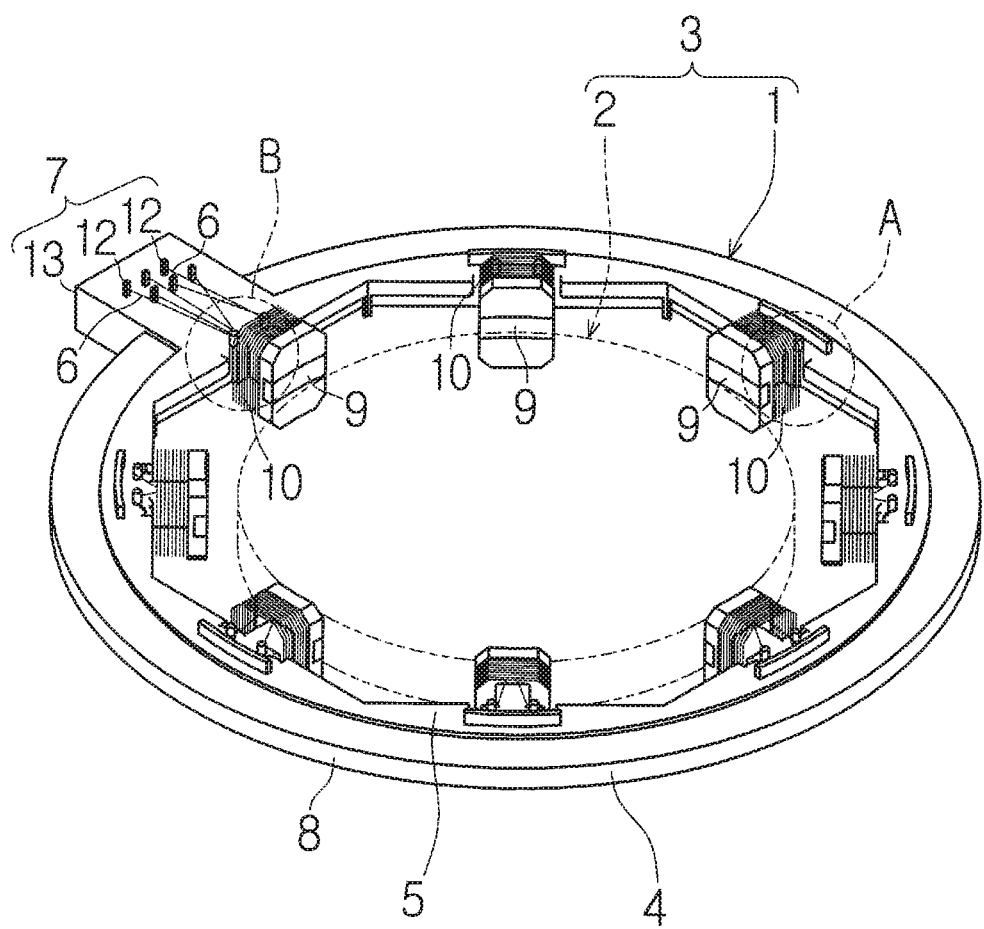
FIG. 1 is a perspective view of a resolver stator (first exemplary embodiment)
Figure 2:
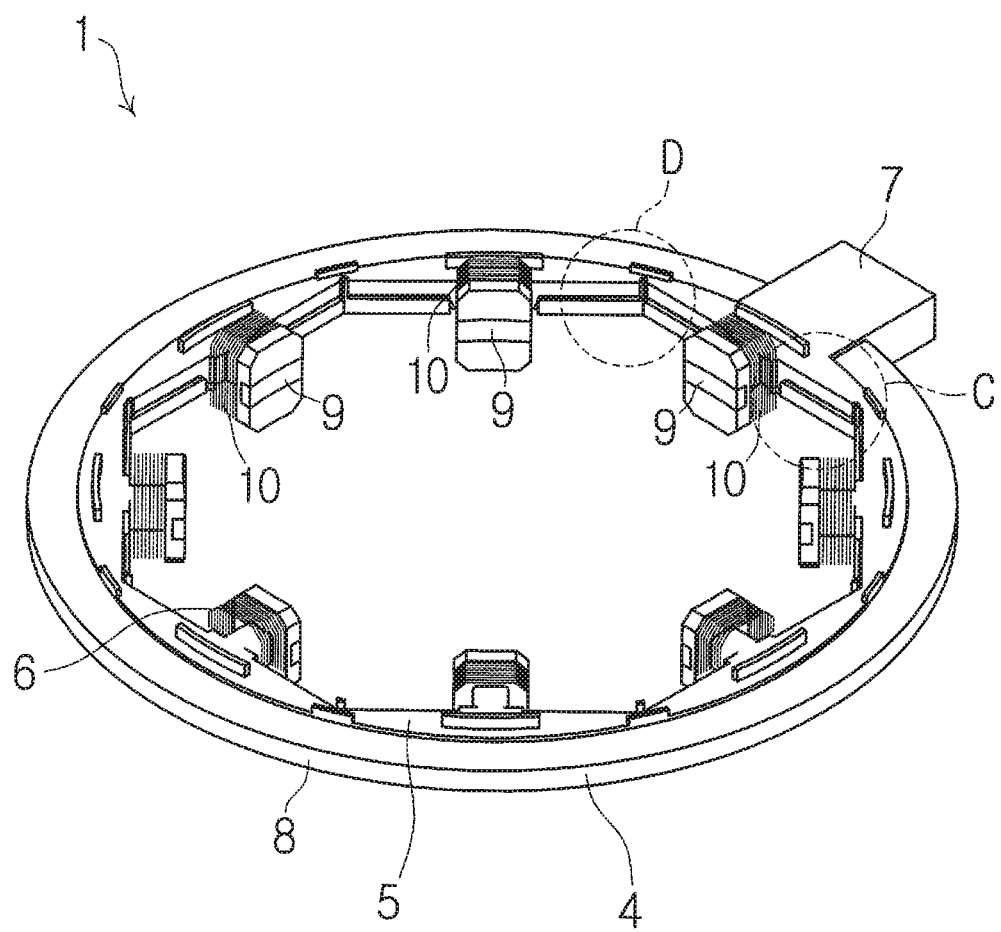
FIG. 2 is a perspective view of the resolver stator as viewed at a different angle (first exemplary embodiment)
Figure 3:
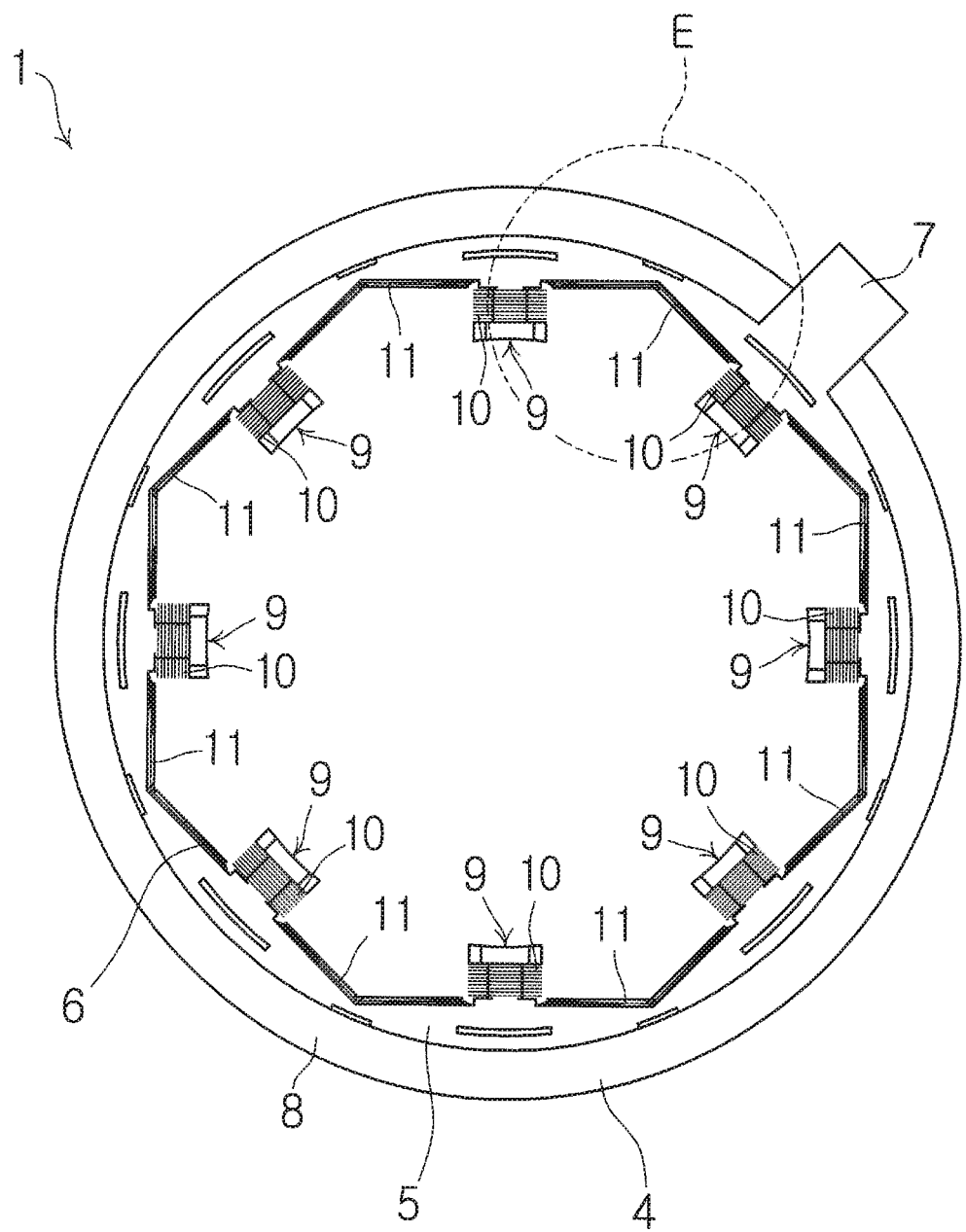
FIG. 3 is a bottom view of the resolver stator (first exemplary embodiment)

FIG. 1 shows a perspective view of a resolver stator 1 as viewed from the front side thereof and FIG. 2 shows a perspective view of the resolver stator 1 as viewed from the rear side thereof. Further, FIG. 3 shows a bottom view of the resolver stator 1. Further, a resolver rotor 2 is indicated by chain double-dashed lines in FIG. 1.

As shown in FIG. 1, a resolver 3 is used for detecting a rotation of an output shaft of, for example, an engine or a motor and includes the resolver rotor 2 fixed to the output shaft and the ring-shaped resolver stator 1 disposed so as to surround the resolver rotor 2.

As shown in FIGS. 1 to 3, the resolver stator 1 includes a stator core 4, an insulator 5, a plurality of stator windings 6, and a terminal strip 7.

As shown in FIGS. 1 and 2, the stator core 4 includes a ring-shaped stator core main body 8 and a plurality of tooth parts 9 protruding radially inward from the stator core main body 8. The plurality of tooth parts 9 are arranged at regular intervals in the circumferential direction.

The insulator 5 is made of a resin that is insert-molded into the stator core 4 and is provided to mainly ensure electrical insulation between the stator core 4 and the plurality of stator windings 6. Specific shapes of the insulator 5 will be described later.

As shown in FIG. 3, the plurality of stator windings 6 include a plurality of coils 10 and a plurality of connecting wires 11. Each of the coils 10 is formed on a respective one of the tooth parts 9 by winding the plurality of stator windings 6 around the one of the tooth parts 9. Each of the connecting wires 11 electrically connects a plurality of coils 10 with each other. For example, each of the connecting wires 11 electrically connects two coils 10 that are adjacent to each other in the circumferential direction. In this exemplary embodiment, for the sake of explanation, a plurality of connecting wires 11 are disposed between two coils 10 that are adjacent to each other in the circumferential direction. A specific wiring of the connecting wires 11 will be described later.

As shown in FIG. 1, the terminal strip 7 is a part for holding ends of the plurality of stator windings 6 in order to externally output detection signals generated by the resolver stator 1. The terminal strip 7 includes a plurality of output terminals 12 to which the ends of the plurality of stator windings 6 are connected respectively, and a terminal holding part 13 for holding the plurality of output terminals 12 by means of insert-molding. The terminal holding part 13 is integrally formed with the insulator 5.

Figure 4:
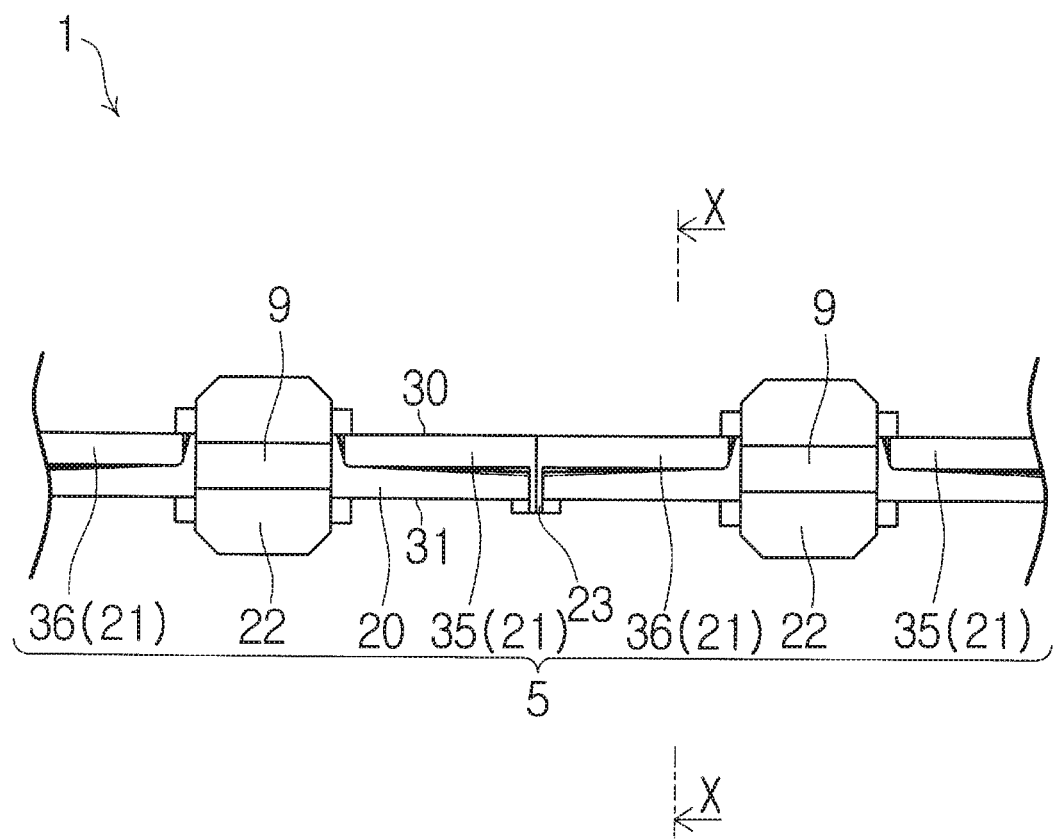
FIG. 4 is a developed view of the resolver stator (first exemplary embodiment)
Figure 5:
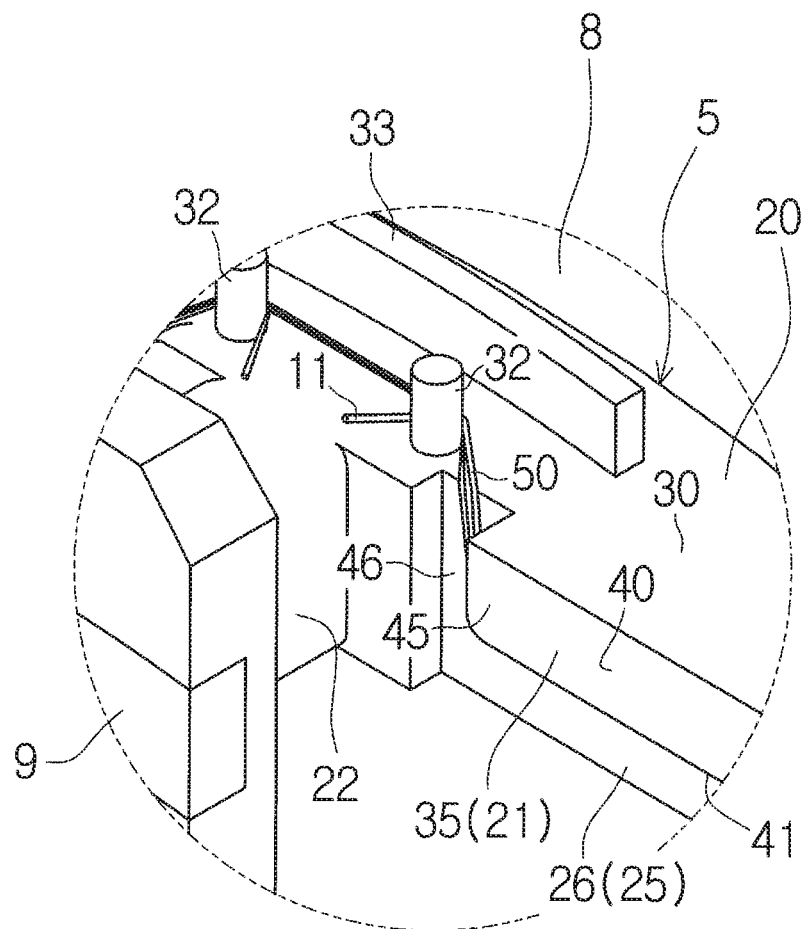
FIG. 5 is an enlarged view of a part A in FIG. 1 (first exemplary embodiment)
Figure 6:
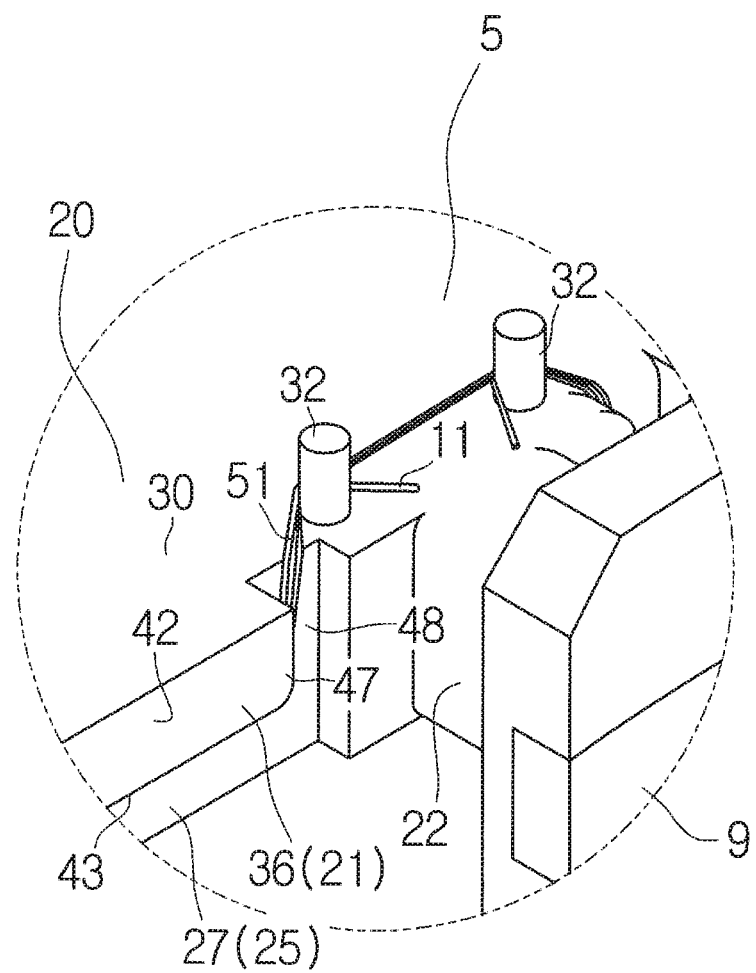
FIG. 6 is an enlarged view of a part B in FIG. 1 (first exemplary embodiment)
Figure 7:
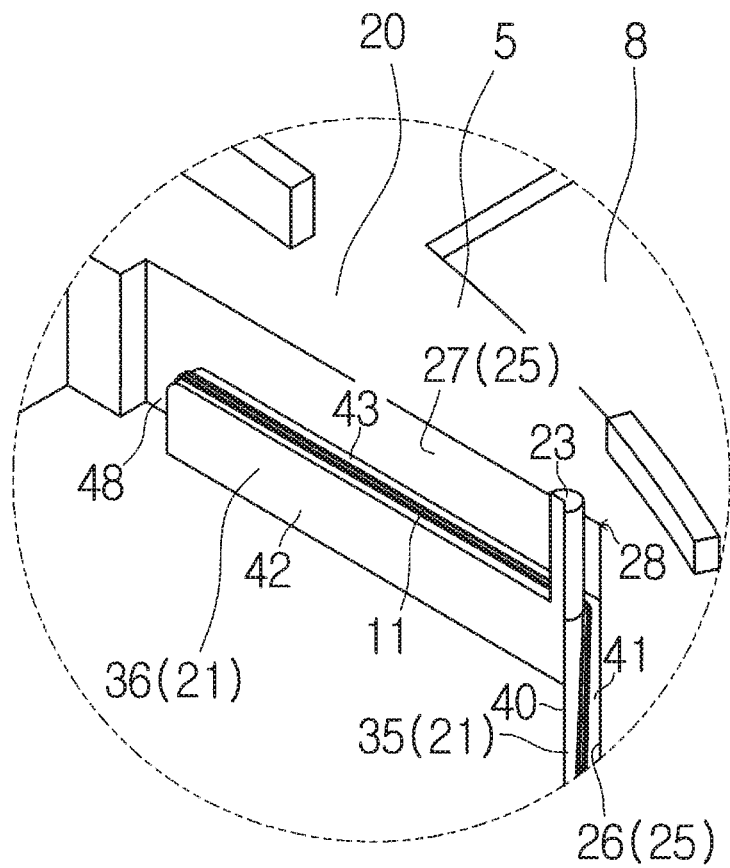
FIG. 7 is an enlarged view of a part C in FIG. 2 (first exemplary embodiment)
Figure 8:
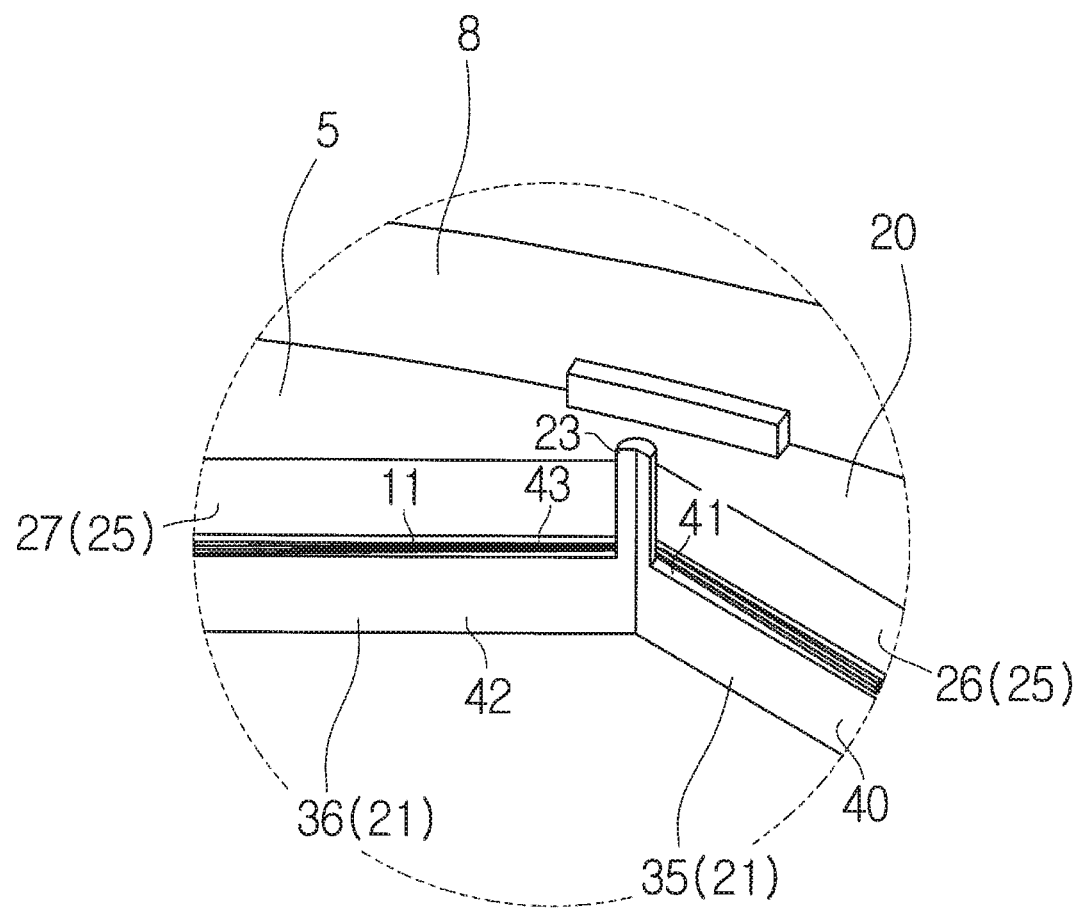
FIG. 8 is an enlarged view of a part D in FIG. 2 (first exemplary embodiment)
Figure 9:
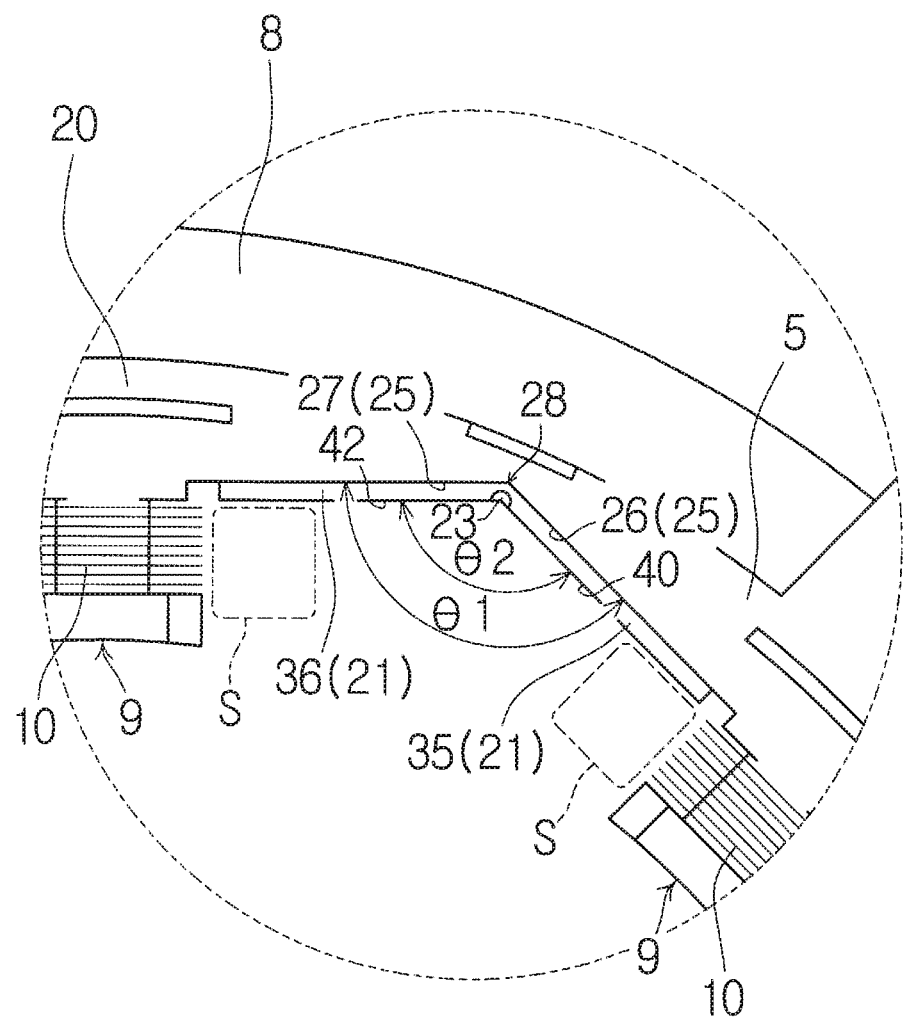
FIG. 9 is an enlarged view of a part E in FIG. 3 (first exemplary embodiment)
Figure 10:
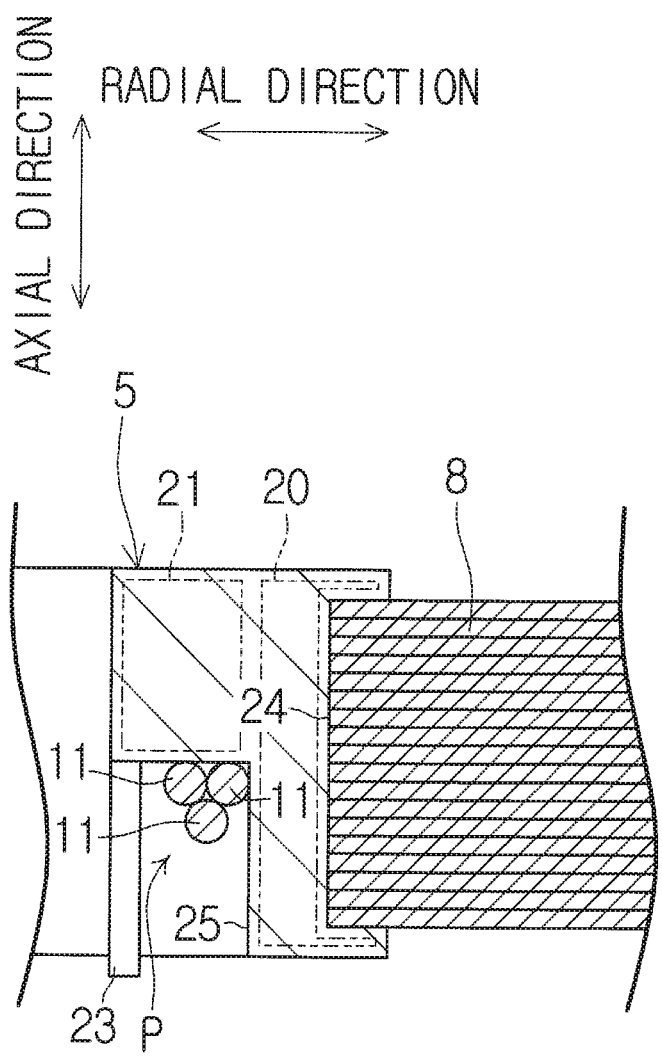
FIG. 10 is a cross section taken along a line X-X in FIG. 4 (first exemplary embodiment)

Next, the shape of the insulator 5 and the arrangement of the connecting wires 11 are explained in detail. FIG. 4 shows a developed view of the resolver stator 1 as viewed from the inside. FIG. 5 shows an enlarged view of a part A in FIG. 1. FIG. 6 shows an enlarged view of a part B in FIG. 1. FIG. 7 shows an enlarged view of a part C in FIG. 2. FIG. 8 shows an enlarged view of a part D in FIG. 2. FIG. 9 shows an enlarged view of a part E in FIG. 3. FIG. 10 shows a cross section taken along a line X-X in FIG. 4. Note that for the sake of explanation, the coils 10 are not drawn in FIGS. 5 to 7 and the connecting wires 11 are not drawn in FIG. 9.

As shown in FIGS. 1 to 3, the insulator 5 is generally formed into a ring shape along the stator core 4. As shown in FIGS. 4 to 10, the insulator 5 includes an insulator main body 20, a plurality of protruding parts 21, a plurality of tooth insulating parts 22, and a plurality of holding protrusions 23.

As shown in FIGS. 5 and 6, each of the tooth insulating parts 22 is formed so as to cover a respective one of the tooth parts 9 and ensures electrical insulation between the coil 10 (not shown) and the tooth part 9.

As shown in FIG. 10, the insulator main body 20 is a part that is formed into a ring shape so as to cover an inner-peripheral edge 24 of the ring-shaped stator core main body 8. The insulator main body 20 has an insulator main body inner surface 25 that faces radially inward between two of the tooth parts 9 adjacent to each other in the circumferential direction. As shown in FIGS. 7 to 9, the insulator main body inner surface 25 includes a first insulator main body inner surface 26 and a second insulator main body inner surface 27. The first and second insulator main body inner surfaces 26 and 27 are formed so that they are adjacent to each other in the circumferential direction. The first and second insulator main body inner surfaces 26 and 27 are in contact with each other. Each of the first and second insulator main body inner surfaces 26 and 27 is formed as a plane surface. Each of the first and second insulator main body inner surfaces 26 and 27 generally extends in a straight manner in the circumferential direction as viewed in the axial direction of the resolver stator 1. That is, the first and second insulator main body inner surfaces 26 and 27 are not on the same plane as each other. The first and second insulator main body inner surfaces 26 and 27 are in contract with each other at a certain angle. As shown in FIG. 9, an angle θ1 between the first and second insulator main body inner surfaces 26 and 27 is smaller than 180 degrees as viewed in the axial direction. In this exemplary embodiment, the angle θ1 is about 135 degrees. The intersection 28 of the first and second insulator main body inner surfaces 26 and 27 extends in the axial direction.

Further, as shown in FIG. 4, the insulator main body 20 has a main body top surface 30 and a main body bottom surface 31. As shown in FIGS. 5 and 6, a plurality of connecting wire holding protrusions 32 and a plurality of connecting wire protection walls 33 are formed on the main body top surface 30 of the insulator main body 20. Specifically, as shown in FIG. 5, two connecting wire holding protrusions 32 are formed near each of the tooth parts 9 and one connecting wire protection wall 33 is formed radially outward with respect to the two connecting wire holding protrusions 32.

As shown in FIGS. 5 to 8 and FIG. 10, the plurality of protruding parts 21 are formed so as to protrude radially inward from the insulator main body 20. Specifically, as shown in FIG. 10, the plurality of protruding parts 21 protrude from the insulator main body 20 in such a manner that they protrude radially inward beyond the insulator main body inner surface 25 of the insulator main body 20. As shown in FIG. 4, two protruding parts 21 protrude radially inward from the insulator main body 20 between two of the tooth parts 9 that are adjacent to each other in the circumferential direction. The two protruding parts 21 are formed so that they are adjacent to each other in the circumferential direction. The two protruding parts 21 are in contact with each other. As shown in FIG. 9, which is a bottom view, a protruding part 21 formed on the upper side of the first insulator main body inner surface 26 is referred to as a first protruding part 35 and a protruding part 21 formed on the upper side of the second insulator main body inner surface 27 is referred to as a second protruding part 36 in the following explanation. As shown in FIG. 9, the first and second protruding parts 35 and 36 generally extend in a straight manner in the circumferential direction as viewed in the axial direction of the resolver stator 1. As shown in FIG. 5, the first protruding part 35 has a first protruding part inner surface 40 facing radially inward and a first protruding part bottom surface 41 facing downward in the axial direction. The first protruding part inner surface 40 and the first protruding part bottom surface 41 are both formed in plane surfaces. As shown in FIG. 6, the second protruding part 36 has a second protruding part inner surface 42 facing radially inward and a second protruding part bottom surface 43 facing downward in the axial direction. The second protruding part inner surface 42 and the second protruding part bottom surface 43 are both formed in plane surfaces. As shown in FIG. 9, an angle θ2 between the first and second protruding part inner surfaces 40 and 42 is smaller than 180 degrees. In this exemplary embodiment, the angle θ2 is equal to the angle θ1 and is about 135 degrees. As shown in FIG. 5, a first access passage 46 (access passage) is formed between an end 45 of the first protruding part 35 and the tooth insulating part 22. The first access passage 46 is formed as a groove that extends in the axial direction and is opened radially inward. Similarly, as shown in FIG. 6, a second access passage 48 is formed between an end 47 of the second protruding part 36 and the tooth insulating part 22. The second access passage 48 is formed as a groove that extends in the axial direction and is opened radially inward.

As shown in FIG. 7, each of the holding protrusions 23 is formed so as to protrude downward in the axial direction from a respective one of the protruding parts 21. Specifically, each of the holding protrusions 23 is disposed near the intersection 28 of the first and second insulator main body inner surfaces 26 and 27. To be more specific, each of the holding protrusions 23 is formed so as to be opposed to the intersection 28 in the radial direction of the resolver stator 1. Each of the holding protrusions 23 is disposed away from the insulator main body inner surface 25. Each of the holding protrusions 23 is disposed radially inward with respect to the insulator main body inner surface 25. Each of the holding protrusions 23 is opposed to the insulator main body inner surface 25 in the radial direction of the resolver stator 1.

Next, the connecting wires 11 are explained.

Wiring of the connecting wires 11 is performed with an ordinary automatic winding machine. That is, after the stator winding 6 is wound around the tooth insulating part 22 to form a coil 10, as shown in FIG. 5, the connecting wire 11 from the coil 10 is first hooked on the connecting wire holding protrusion 32 and then guided to the underside of the first protruding part 35 through the first access passage 46. Next, as shown in FIG. 7, the connecting wire 11 is wired along the first protruding part bottom surface 41 of the first protruding part 35, disposed between the holding protrusion 23 and the intersection 28, wired along the second protruding part bottom surface 43 of the second protruding part 36, and as shown in FIG. 6, wired to the opposite side of the second protruding part 36 through the second access passage 48. Then, after the connecting wire 11 is hooked on the connecting wire holding protrusion 32, the connecting wire 11 is wound around the next tooth insulating part 22. By repeating the above-described procedure, a plurality of coils 10 are formed in respective tooth parts 9 and the plurality of coils 10 are electrically connected to one another through the connecting wires 11.

The above-described first exemplary embodiment has the following features (or advantages).

(1) A resolver stator 1 includes: the stator core 4 including the ring-shaped stator core main body 8, and the plurality of tooth parts 9 protruding radially inward from the stator core main body 8; the insulator 5 disposed radially inward with respect to the stator core main body 8; the plurality of coils 10 wound around the plurality of tooth parts 9 respectively; and the connecting wire 11 configured to electrically connect the plurality of coils 10 to one another. The insulator 5 includes the insulator main body 20 having the insulator main body inner surface 25 facing radially inward, and the protruding part 21 protruding radially inward beyond the insulator main body inner surface 25. As shown in FIG. 10, the connecting wire 11 is disposed so as to be opposed to the protruding part 21 in the axial direction (a direction parallel to the rotation axis of the resolver stator 1) and also opposed to the insulator main body inner surface 25 in the radial direction (a direction perpendicular to the rotation axis). By the above-described configuration, it is possible to prevent the operator from touching the connecting wire 11 directly by the hand when the operator holds the resolver stator 1. Therefore, it is possible to prevent the connecting wire 11 from being broken when the resolver stator 1 is handled.

In other words, the connecting wire 11 is wired along a step P formed by the insulator main body inner surface 25 of the insulator main body 20 and the protruding part 21. By the above-described configuration, it is possible to prevent the operator from touching the connecting wire 11 directly by the hand when the operator holds the resolver stator 1. Therefore, it is possible to prevent the connecting wire 11 from being broken when the resolver stator 1 is handled.

(2) Further, as shown in FIG. 10, the connecting wire 11 touches the protruding part 21 in the axial direction. By the above-described configuration, it is possible to prevent the operator from touching the connecting wire 11 directly by the hand in a more reliable manner when the operator holds the resolver stator 1.

(3) Further, as shown in FIG. 7, the insulator main body inner surface 25 is formed as the plane surface. By the above-described configuration, compared to the case where the insulator main body inner surface 25 is curved in a convex shape radially outward, it is possible to prevent the connecting wire 11 from floating away from the insulator main body inner surface 25.

(4) Further, as shown in FIG. 7, the insulator 5 further includes the holding protrusion 23 protruding from the protruding part 21 in the axial direction. The connecting wire 11 is disposed between the insulator main body inner surface 25 and the holding protrusion 23. By the above-described configuration, it is possible to effectively prevent the connecting wire 11 from floating away from the insulator main body inner surface 25.

(5) Further, as shown in FIGS. 5 and 6, the insulator 5 further includes the first access passage 46 or the second access passage 48 as an access passage for allowing the connecting wire 11 to be wired to the opposite side of the protruding part 21 without getting over the protruding part 21. By the above-described configuration, the connecting wire 11 can be wired to the opposite side of the protruding part 21 without floating the connecting wire 11 radially inward.

In other words, the insulator 5 further includes the first access passage 46 or the second access passage 48 as an access passage for allowing the connecting wire 11 to be wired beyond the protruding part 21 without getting over the protruding part 21. By the above-described configuration, the connecting wire 11 can be wired to the opposite side of the protruding part 21 without floating the connecting wire 11 radially inward.

One of the first and second access passages 46 and 48 can be omitted.

(6) Further, as shown in FIGS. 5 and 6, the first access passage 46 and the second access passage 48 are formed as two access passages. Both ends (the ends 50 and 51) of the connecting wire 11 are wired to the opposite side of the protruding part 21 through the first and second access passages 46 and 48. By the above-described configuration, both ends (ends 50 and 51) of the connecting wire 11 can be wired to the opposite side of the protruding part 21.

(7) Further, as shown in FIG. 9, the insulator main body inner surface 25 has the first insulator main body inner surface 26 and the second insulator main body inner surface 27 that are adjacent to each other in the circumferential direction. Each of the first and second insulator main body inner surfaces 26 and 27 is formed as a plane surface. The angle θ1 between the first and second insulator main body inner surfaces 26 and 27 is smaller than 180 degrees. By the above-described configuration, compared to the case where the insulator main body inner surface 25 is formed as a single plane surface, a large space S can be secured near the base of each of the tooth parts 9, thus making it easier to wind the stator winding 6 around each of the tooth parts 9 with the automatic winding machine.

(8) Further, as shown in FIGS. 7 and 8, the insulator 5 further includes the holding protrusion 23 protruding from the protruding part 21 in the axial direction. The connecting wire 11 is disposed between the insulator main body inner surface 25 and the holding protrusion 23. By the above-described configuration, it is possible to effectively prevent the connecting wire 11 from floating away from the insulator main body inner surface 25.

(9) Further, as shown in FIG. 9, the holding protrusion 23 is disposed near the intersection 28 of the first and second insulator main body inner surfaces 26 and 27. By the above-described configuration, it is possible to effectively prevent the connecting wire 11 from floating away from the insulator main body inner surface 25 near the intersection 28 of the first and second insulator main body inner surfaces 26 and 27.

Note that in practice, the connecting wire 11 is wired with some degree of tensile strength in FIG. 9. Therefore, although the connecting wire 11 is disposed away from the first and second insulator main body inner surfaces 26 and 27, it is tightly in contact with the outer-peripheral surface of the holding protrusion 23. Therefore, the connecting wire 11 is effectively prevented from projecting radially inward beyond the first protruding part inner surface 40 or the second protruding part inner surface 42.

Note that in the case where a curved surface or another plane surface is interposed between the first and second insulator main body inner surfaces 26 and 27, the holding protrusion 23 is preferably disposed near an imaginary intersection of the first and second insulator main body inner surfaces 26 and 27. Even in such a case, it is possible to effectively prevent the connecting wire 11 from floating away from the insulator main body inner surface 25 near the imaginary intersection of the first and second insulator main body inner surfaces 26 and 27.

(10) Further, as shown in FIG. 10, the resolver stator 1 includes the plurality of connecting wires 11. The plurality of connecting wires 11 are disposed so as to be opposed to the protruding part 21 in the axial direction and also opposed to the insulator main body inner surface 25 in the radial direction, while being piled up on each other in a bundle-like manner, between two of the coils 10 that are adjacent to each other in the circumferential direction.

Second Exemplary Embodiment

Figure 11:
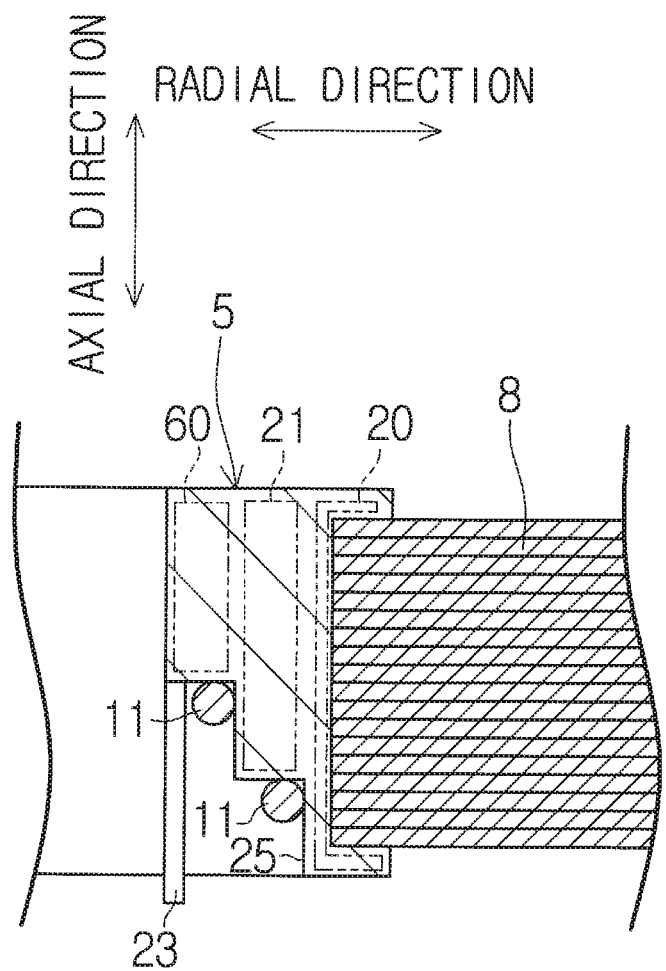
FIG. 11 is a cross section corresponding to FIG. 10 (second exemplary embodiment)
Figure 12:
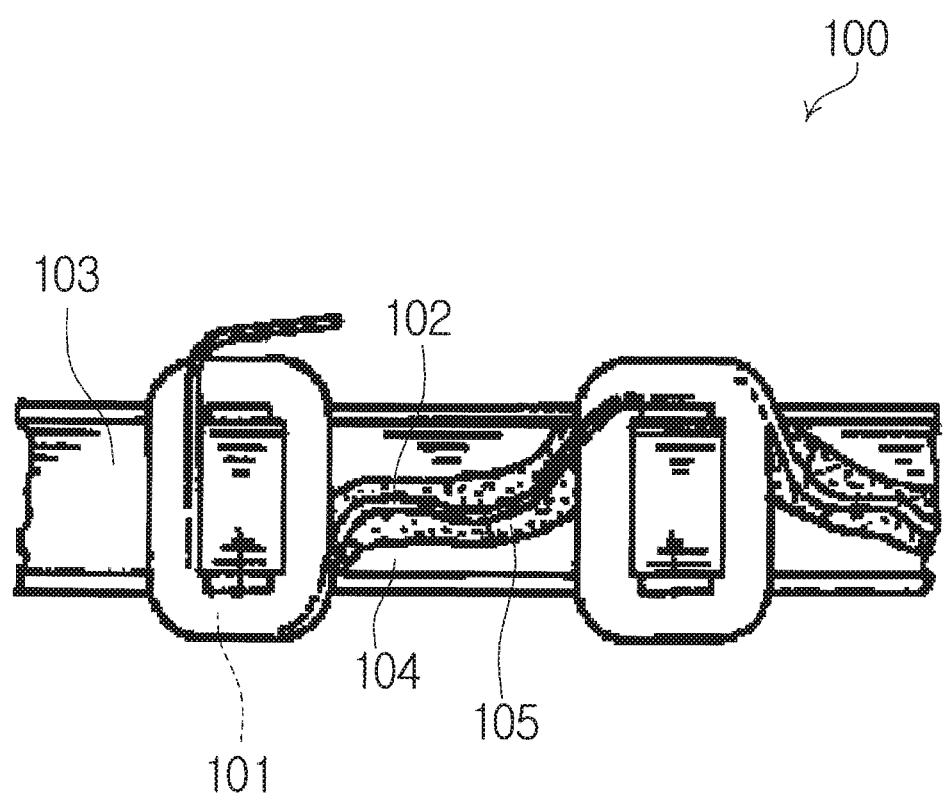
FIG. 12 is a drawing corresponding to FIG. 6 of Patent Literature 1.

Next, a second exemplary embodiment is explained with reference to FIG. 11. The following explanation is given with particular emphasis on differences between this exemplary embodiment and the above-described first exemplary embodiment, and duplicated explanations are omitted.

In this exemplary embodiment, the insulator 5 further includes an additional protruding part 60 protruding radially inward beyond the protruding part 21. One of the plurality of connecting wires 11 is disposed so as to be opposed to the protruding part 21 in the axial direction and also opposed to the insulator main body inner surface 25 in the radial direction between two of the coils 10 that are adjacent to each other in the circumferential direction. Another of the plurality of connecting wires 11 is disposed so as to be opposed to the additional protruding part 60 in the axial direction and also opposed to the protruding part 21 in the radial direction. By the above-described configuration, it is possible to arrange the plurality of connecting wires 11 away from each other.

This application is based upon and claims the benefit of priority from Japanese patent application No. 2014-191024, filed on Sep. 19, 2014, the disclosure of which is incorporated herein in its entirety by reference.

REFERENCE SIGNS LIST

1 RESOLVER STATOR
2 RESOLVER ROTOR
3 RESOLVER
4 STATOR CORE
5 INSULATOR
6 STATOR WINDING
7 TERMINAL STRIP
8 STATOR CORE MAIN BODY

9 TOOTH PART
10 COIL
11 CONNECTING WIRE
12 OUTPUT TERMINAL
13 TERMINAL HOLDING PART
20 INSULATOR MAIN BODY
21 PROTRUDING PART
22 TOOTH INSULATING PART
23 HOLDING PROTRUSION
24 INNER-PERIPHERAL EDGE
25 INSULATOR MAIN BODY INNER SURFACE
26 FIRST INSULATOR MAIN BODY INNER SURFACE (INSULATOR MAIN BODY INNER SURFACE)
27 SECOND INSULATOR MAIN BODY INNER SURFACE (INSULATOR MAIN BODY INNER SURFACE)
28 INTERSECTION
30 MAIN BODY TOP SURFACE
31 MAIN BODY BOTTOM SURFACE
32 CONNECTING WIRE HOLDING PROTRUSION
33 CONNECTING WIRE PROTECTION WALL
35 FIRST PROTRUDING PART (PROTRUDING PART)
36 SECOND PROTRUDING PART (PROTRUDING PART)
40 FIRST PROTRUDING PART INNER SURFACE
41 FIRST PROTRUDING PART BOTTOM SURFACE
42 SECOND PROTRUDING PART INNER SURFACE
43 SECOND PROTRUDING PART BOTTOM SURFACE
45 END
46 FIRST ACCESS PASSAGE (ACCESS PASSAGE)
47 END
48 SECOND ACCESS PASSAGE (ACCESS PASSAGE)
50 END
51 END
60 ADDITIONAL PROTRUDING PART
P STEP
S SPACE
θ1 ANGLE
θ2 ANGLE

The invention claimed is:

1. A resolver stator comprising:
a stator core comprising a ring-shaped stator core main body, and a plurality of tooth parts protruding radially inward from the stator core main body;
an insulator disposed radially inward with respect to the stator core main body;
a plurality of coils wound around the plurality of tooth parts, respectively; and
at least one connecting wire configured to electrically connect the plurality of coils to one another, wherein
the insulator comprises an insulator main body having an insulator main body inner surface facing radially inward, and a protruding part protruding radially inward beyond the insulator main body inner surface, and
the at least one connecting wire is disposed so as to be opposed to the protruding part in a direction parallel to a rotation axis of the resolver stator and also opposed to the insulator main body inner surface in a direction perpendicular to the rotation axis,
the insulator further comprises a holding protrusion protruding from the protruding part in the direction parallel to the rotation axis, and
the at least one connecting wire is disposed between the insulator main body inner surface and the holding protrusion.

2. The resolver stator according to claim 1, wherein the at least one connecting wire touches the protruding part in the direction parallel to the rotation axis.

3. The resolver stator according to claim 1, wherein the insulator main body inner surface is formed as a plane surface.

4. The resolver stator according to claim 1, wherein the insulator further comprises at least one access passage for allowing the at least one connecting wire to be wired to an opposite side of the protruding part without getting over the protruding part.

5. The resolver stator according to claim 4, wherein the at least one access passage comprises two access passages, and
both ends of the at least one connecting wire are wired to the opposite side of the protruding part through the two access passages respectively.

6. The resolver stator according to claim 1, wherein the insulator main body inner surface has a first insulator main body inner surface and a second insulator main body inner surface adjacent to each other in a circumferential direction,
each of the first and second insulator main body inner surfaces is formed as a plane surface, and
an angle between the first and second insulator main body inner surfaces is smaller than 180 degrees.

7. The resolver stator according to claim 6, wherein the holding protrusion is disposed near an intersection or an imaginary intersection of the first and second insulator main body inner surfaces.

8. The resolver stator according to claim 1, wherein
the at least one connecting wire comprises a plurality of connecting wires, and
between two of the coils that are adjacent to each other in a circumferential direction, the plurality of connecting wires are disposed so as to be opposed to the protruding part in the direction parallel to the rotation axis and also opposed to the insulator main body inner surface in the direction perpendicular to the rotation axis, while being piled up on each other in a bundle-like manner.

9. The resolver stator according to claim 1, wherein
the at least one connecting wire comprises a plurality of connecting wires,
the insulator further includes an additional protruding part protruding radially inward beyond the protruding part, and
between two of the coils that are adjacent to each other in a circumferential direction, one of the connecting wires is disposed so as to be opposed to the protruding part in the direction parallel to the rotation axis and also opposed to the insulator main body inner surface in the direction perpendicular to the rotation axis, and another of the connecting wires is disposed so as to be opposed to the additional protruding part in the direction parallel to the rotation axis and also opposed to the protruding part in the direction perpendicular to the rotation axis.

10. A resolver stator comprising:
a stator core comprising a ring-shaped stator core main body, and a plurality of tooth parts protruding radially inward from the stator core main body;
an insulator disposed radially inward with respect to the stator core main body;
a plurality of coils wound around the plurality of tooth parts respectively; and
at least one connecting wire configured to electrically connect the plurality of coils to one another, wherein the insulator comprises an insulator main body having an insulator main body inner surface facing radially inward, and a protruding part protruding radially inward beyond the insulator main body inner surface, and the at least one connecting wire is disposed so as to be opposed to the protruding part in a direction parallel to a rotation axis of the resolver stator and also opposed to the insulator main body inner surface in a direction perpendicular to the rotation axis, the insulator further comprises at least one access passage for allowing the at least one connecting wire to be wired to an opposite side of the protruding part without getting over the protruding part, the at least one access passage comprises two access passages, and both ends of the at least one connecting wire are wired to the opposite side of the protruding part through the two access passages respectively.

11. A resolver stator comprising:

a stator core comprising a ring-shaped stator core main body, and a plurality of tooth parts protruding radially inward from the stator core main body;

an insulator disposed radially inward with respect to the stator core main body;

a plurality of coils wound around the plurality of tooth parts respectively; and at least one connecting wire configured to electrically connect the plurality of coils to one another, wherein the insulator comprises an insulator main body having an insulator main body inner surface facing radially inward, and a protruding part protruding radially inward beyond the insulator main body inner surface, and the at least one connecting wire is disposed so as to be opposed to the protruding part in a direction parallel to a rotation axis of the resolver stator and also opposed to the insulator main body inner surface in a direction perpendicular to the rotation axis, the insulator main body inner surface has a first insulator main body inner surface and a second insulator main body inner surface adjacent to each other in a circumferential direction, each of the first and second insulator main body inner surfaces is formed as a plane surface, and an angle between the first and second insulator main body inner surfaces is smaller than 180 degrees.

12. The resolver stator according to claim 11, wherein the insulator further comprises a holding protrusion protruding from the protruding part in the direction parallel to the rotation axis, and the at least one connecting wire is disposed between the insulator main body inner surface and the holding protrusion.

13. The resolver stator according to claim 12, wherein the holding protrusion is disposed near an intersection or an imaginary intersection of the first and second insulator main body inner surfaces.

* * * * *